United States Patent
Gurevich et al.

(10) Patent No.: US 7,182,260 B2
(45) Date of Patent: Feb. 27, 2007

(54) AIMING LIGHT PATTERN GENERATOR IN IMAGING READERS FOR ELECTRO-OPTICALLY READING INDICIA

(75) Inventors: Vladimir Gurevich, Stony Brook, NY (US); Alexander Breytman, Bellmore, NY (US); David Tsi Shi, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 301 days.

(21) Appl. No.: 10/879,333

(22) Filed: Jun. 29, 2004

(65) Prior Publication Data

US 2005/0284942 A1   Dec. 29, 2005

(51) Int. Cl.
*G06K 7/10* (2006.01)

(52) U.S. Cl. .............................. 235/462.08; 235/462.2
(58) Field of Classification Search .......... 235/462.08, 235/462.2, 462.21
See application file for complete search history.

(56) References Cited

U.S. PATENT DOCUMENTS

| | | | |
|---|---|---|---|
| 6,832,725 B2 * | 12/2004 | Gardiner et al. | 235/462.21 |
| 6,877,664 B1 * | 4/2005 | Oliva | 235/462.42 |
| 6,914,731 B2 * | 7/2005 | Fredriksson | 359/754 |

* cited by examiner

*Primary Examiner*—Karl D. Frech
(74) *Attorney, Agent, or Firm*—Kirschstein, et al.

(57) ABSTRACT

Different aiming light patterns are generated to enable an imaging reader to be pointed directly at a target by employing non-interferometric optical components that are fabricated by molding and machining techniques.

24 Claims, 5 Drawing Sheets

AIMING LIGHT PATTERN GENERATOR IN IMAGING READERS FOR ELECTRO-OPTICALLY READING INDICIA

BACKGROUND OF THE INVENTION

1. Field of the Invention

The present invention generally relates to image capture systems and methods and, more particularly, to generating well-defined aiming light patterns on optical code symbols prior to their being electro-optically imaged and read.

2. Description of the Related Art

Optical codes are patterns made up of image areas having different light-reflective or light-emissive properties, which are typically assembled in accordance with a priori rules. The term "barcode" is sometimes used to describe certain kinds of optical codes. The optical properties and patterns of optical codes are selected to distinguish them in appearance from the background environments in which they are used. Devices for identifying or extracting data from optical codes are sometimes referred to as "optical code readers" of which barcode scanners are one type. Optical code readers are used in both fixed or portable installations in many diverse environments such as in stores for check-out services, in manufacturing locations for work flow and inventory control, and in transport vehicles for tracking package handling. The optical code can be used as a rapid, generalized means of data entry, for example, by reading a target barcode from a printed listing of many barcodes. In some uses, the optical code reader is connected to a portable data processing device or a data collection and transmission device. Frequently, the optical code reader includes a handheld sensor which is manually directed at a target code.

Most conventional optical scanning systems are designed to read one-dimensional barcode symbols. The barcode is a pattern of variable-width rectangular bars separated by fixed or variable width spaces. The bars and spaces have different light-reflecting characteristics. One example of a one-dimensional barcode is the UPC/EAN code used to identify, for example, product inventory. An example of a two-dimensional or stacked barcode is the PDF417 barcode. A description of PDF417 barcode and techniques for decoding it is disclosed in U.S. Pat. No. 5,635,697. Another conventional optical code is known as "MaxiCode". It consists of a central finder pattern or bull's eye center and a grid of hexagons surrounding the central finder. It should be noted that the aspects of the inventions disclosed in this patent application are applicable to optical code readers, in general, without regard to the particular type of optical codes which they are adapted to read. The invention described is also applicable to some associated image recognition or analysis.

Most conventional scanning systems generate one or more beams of laser light which reflects off a barcode symbol and back to the system. The system obtains a continuous analog waveform corresponding to the light reflected by the code along one or more scan lines of the system. The system then decodes the waveform to extract information from the barcode. A system of this general type is disclosed, for example, in U.S. Pat. No. 4,251,798. A beam scanning system for detecting and decoding one-and two-dimensional barcodes is disclosed in U.S. Pat. No. 5,561,283.

Many scanners in use today employ a moving laser beam. Some such systems are deployed in hand-held units which may be manually pointed at a target. Often an individual scanner is a component of a much larger system including other scanners, computers, cabling, data terminals, etc.

Barcodes can also be read by employing imaging devices, also deployed in hand-held units. For example, an image sensor may be employed which has a one- or two-dimensional array of cells or pixel sensors which correspond to image elements or pixels in a field of view of the device. Such an image sensor may be a two-dimensional or area charge coupled device (CCD) and associated circuits for producing electronic signals corresponding to a two-dimensional array of pixel information for a field of view.

It is therefore known to use a CCD for capturing a monochrome image of a barcode symbol to be read as, for example, disclosed in U.S. Pat. No. 5,703,349. It is also known to use a CCD with multiple buried channels for capturing a full color image of a target as, for example, disclosed in U.S. Pat. No. 4,613,895.

Although generally satisfactory for its intended purpose, the use of an imaging device is frustrated because an operator cannot tell whether the device, or the hand-held unit in which it is mounted, is aimed directly at the barcode. Contrary to moving beam scanners in which the operator can see the beam on the barcode, the imaging device is a passive unit and provides no visual feedback to the operator.

To alleviate such problems, the prior art has proposed in U.S. Pat. No. 6,060,722 an aiming pattern generator for an imaging reader. This known generator utilizes a diffractive element, a holographic element, or a Fresnel element, which generate a light interference pattern. However, such interferometric pattern generators have several limitations, including diffraction power losses and non-uniform or dotted pattern lines.

Also, the maximum angular spread of the interferometric pattern over the field of view is limited by the minimum dimension of each structure of the interferometric element. By way of example, it is known to provide a diffraction grating with periodic structures each having a minimum dimension $T_{min}$. To obtain a maximum angular spread $\alpha_{max}$, it is known that $T_{min} = \lambda / \sin(\alpha_{max})$, where $\lambda$ is the wavelength of the light. In a typical application, $\alpha_{max} = 20$ degrees, and $\lambda = 0.65$ microns, and therefore, $T_{min} = 1.9$ microns. The periodic structures need to be dimensioned to be about half of $T_{min}$ or 0.95 microns. To achieve these dimensions, photoetching is typically required, which however is costly and difficult to perform. For even greater angular spreads, the situation is aggravated and the dimension $T_{min}$ reaches practical fabrication limits.

It is also known to use non-interferometric optical elements to project an aiming line. For example, U.S. Pat. No. 6,069,748 discloses the use of a toroidal lens to project a single aiming line to guide a cutting tool. Such technology, however, is not suitable for electro-optical readers, especially imaging readers operative for reading two-dimensional barcodes, and produces the aiming line with non-uniform light intensity distribution.

SUMMARY OF THE INVENTION

OBJECTS OF THE INVENTION

Accordingly, it is a general object of this invention to improve the aiming pattern generation on optical codes read by employing imaging devices.

More particularly, it is an object of the present invention to generate aiming patterns of diverse and different shapes using a single non-interferometric optical component.

Still another object of the present invention is to enable the optical component to be made inexpensively and by molding and machining techniques for ease of fabrication.

FEATURES OF THE INVENTION

In keeping with the above objects and others which will become apparent hereinafter, one feature of the present invention resides, briefly stated, in an aiming pattern generator in an imaging reader for electro-optically reading indicia having parts of different light reflectivity, such as one-dimensional or two-dimensional barcode symbols. The generator comprises an optical component having a plurality of refractive structures spaced apart along a direction, each structure having a structural dimension T as measured along the direction; and means including a light source, such as a laser diode, for generating a visible, collimated, light beam having a wavelength $\lambda$ and a beam cross-section that has a beam dimension D as measured along the direction, and for directing the beam along an optical axis through the refractive structures for refraction to project an aiming light pattern on the indicia to be read at a maximum angle $\alpha_{max}$ as measured relative to the optical axis, the beam dimension D being greater than the structural dimension T, and the structural dimension T being greater than the wavelength $\lambda$ divided by the sine of the maximum angle $\alpha_{max}$.

Thus, by having T much greater than $\lambda/\sin(\alpha_{max})$, undesired interferometric (diffraction) effects are eliminated, together with diffraction power losses. Having D greater than T provides independence of the aiming pattern from the radiation distribution of the laser diode as well as from lateral shifting of the beam relative to the optical component. As described below, the dimension T is on the order of millimeters, not microns, and hence, lends the optical component to be fabricated by low cost manufacturing processes such as molding or three-dimensional machining, rather than the more costly photoetching.

In the preferred embodiment, the laser diode generates a diverging laser beam, and an aperture stop is located in the path of the diverging beam for forming a predetermined cross-section for the laser beam. A portion of the optical component is operative for optically modifying the beam of predetermined cross-section into the collimated beam.

Each refractive structure is formed with a desired surface profile to obtain a desired aiming pattern. For example, the refractive structures may have curved surfaces for generating the aiming light pattern as a single aiming line with a substantially uniform light intensity lengthwise along the line. Each curved surface may be convex or concave.

As another example, the refractive structures may have planar surfaces and curved surfaces for generating the aiming light pattern as a single aiming line having a line intensity, and a single aiming spot located on the aiming line and having a spot intensity greater than the line intensity. Preferably, at least one of the refractive structures has one of the planar surfaces flanked by two of the curved surfaces.

As an additional example, the refractive structures may have a plurality of planar surfaces for generating a plurality of aiming spots, and preferably, at least one of the refractive structures has one of the planar surfaces flanked by two more of the planar surfaces inclined relative to the one planar surface.

Yet another example resides in the refractive structures being arranged in groups, one of the groups being arranged in a central row along the direction, and two more of the groups being arranged along respective side rows along a transverse direction perpendicular to the direction and being located at opposite sides of the central row. The central row of refractive structures has curved surfaces for generating an aiming line. The side rows of refractive structures have curved surfaces for together generating another aiming line. The aiming pattern comprises both lines appearing on the indicia as crossing at a right angle, thereby simulating the "cross hairs" of a rifle scope.

Still another example is embodied in the refractive structures being arranged in groups, one of the groups being arranged along one row along the direction, and another group being arranged along another row along a transverse direction perpendicular to the direction. The beam cross-section of the laser diode is an ellipse having a major axis extending diagonally across both rows. Both rows of refractive structures have curved surfaces for together generating two aiming lines appearing on the indicia as crossing at a right angle.

As another example, the optical component has a central elongated planar face through which the beam projects as a central aiming spot on the indicia. The refractive structures are arranged in two side rows at opposite sides of the central face and are inclined at opposite angles of inclination relative to the elongation of the central face. Each refractive structure of one of the side rows has a pair of planar surfaces for generating a pair of end aiming spots spaced in one direction away from the central spot. Each refractive structure of the other of the side rows has a pair of planar surfaces for generating another pair of end aiming spots spaced in an opposite direction away from the central spot. The resulting aiming pattern comprises five aiming spots.

In the preferred embodiment, the refractive structures are periodically spaced along the direction, and each refractive structure has a parabolic curvature. The optical component is constituted of a molded or machined material having an index of refraction on the order of 1.5, such as glass or plastic. At least one of the refractive structures is a channel or a hump extending along a transverse direction perpendicular to the direction.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figures 1, 2, 3:
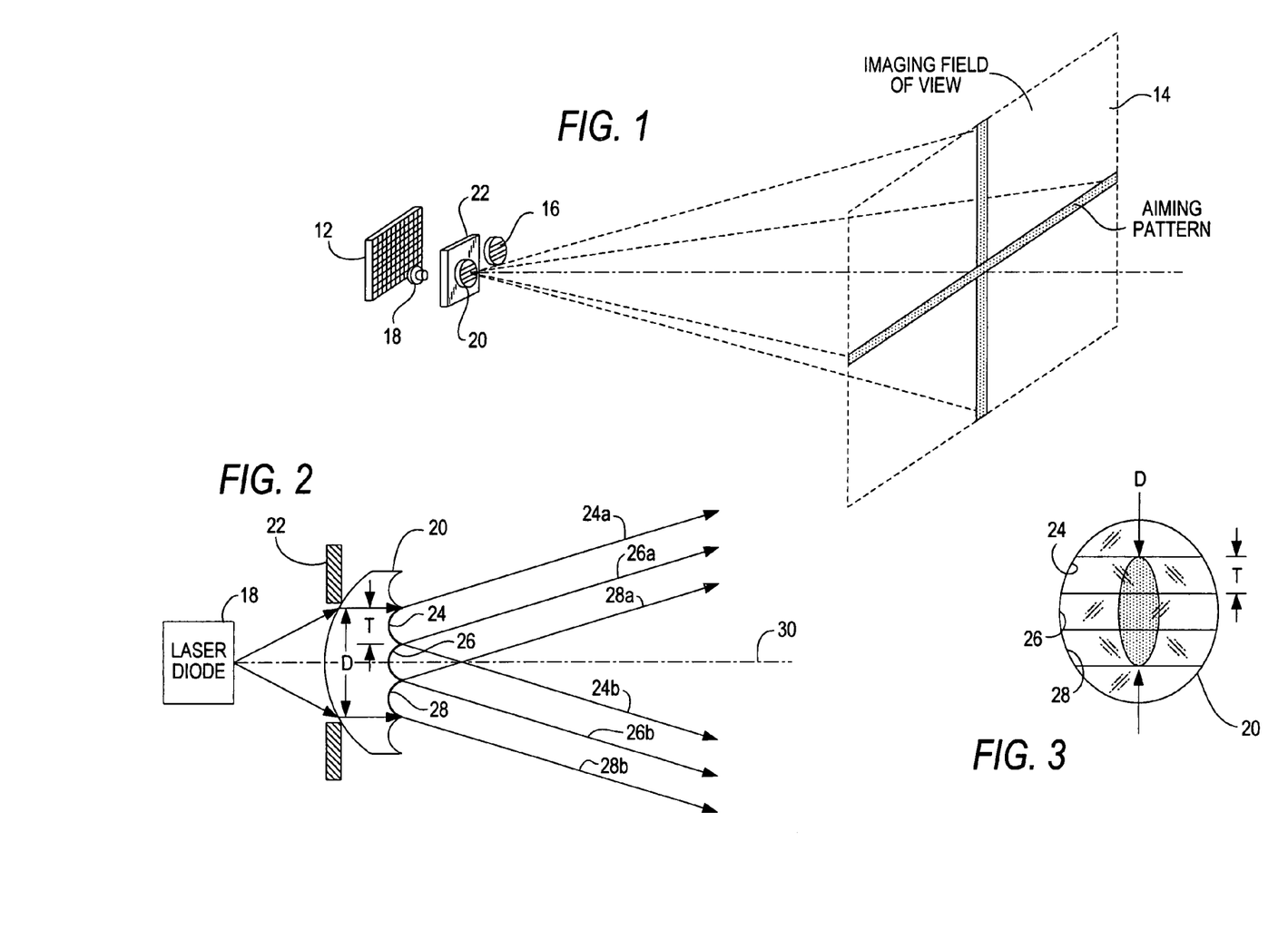
FIG. 1 is a diagrammatic perspective view of some components of an imaging reader in accordance with this invention.
FIG. 2 is a diagrammatic view of an aiming pattern generator for use with the reader of FIG. 1 in accordance with one embodiment of this invention.
FIG. 3 is an end view of the optical component of FIG. 2 with a laser beam superimposed thereon.

Referring now to the drawings, FIG. 1 illustrates an image sensor array 12 operative for converting incident light into electrical signals for processing into an image. A suitable array is disclosed in U.S. Pat. No. 5,965,875, the contents of which are incorporated herein by reference thereto.

In operation, a field of view 14 is imaged by the image sensor array 12. More particularly, light from a target (not illustrated) in the field of view passes through an imaging lens 16 which focuses the light onto the surface of the array. An array of cells or pixel sensors each having one or more photosensors produce electronic signals corresponding to a two-dimensional array of pixel information for a target image.

In order to aim the array 12 at the target, an aiming system is provided. The system includes a laser diode 18, an optical component 20, better seen in FIGS. 2–3, and an aperture stop 22. The laser diode 18 generates a laser beam having a wavelength $\lambda$. The laser beam diverges, as best seen in FIG. 2, until it passes through the aperture stop 22, in which the beam is optically modified to have a predetermined cross-section. Thereupon, the laser beam passes through a front lens portion of the optical component 20, in which the beam is focused and collimated, prior to passing through a rear portion of the optical component. As described below, the rear potion is configured to optically modify the beam passing therethrough to generate a visible, aiming light pattern on the target, thereby assisting an operator in aiming the array 12 at the target.

Turning to FIGS. 2–3, the rear portion of the component 20 is formed with a plurality of refractive structures, for example, elongated concave grooves 24, 26, 28, arranged in parallelism along a direction, for refracting the beam along upper and lower rays 24a, 24b; 26a, 26b; and 28a, 28b; respectively. Each structure has a structural dimension T as considered along the direction. Although the structural dimension T is shown as being the same for all the structures, this need not be the case. The upper and lower rays produced by ray tracing by each structure are angularly spread apart by an angle $2\alpha$, where $\alpha$ is measured relative to the optical axis 30.

The cross-section of the beam has a beam dimension D which, as shown, is greater than the dimension T and, in this case, equals the sum of the structural dimensions of all three structures 24, 26, 28. The dimension T is chosen to be much greater than $\lambda$ divided by the sine of $\alpha$ to minimize any interferometric effects. To obtain a maximum angular spread $\alpha_{max}$ for the field of view, the structural dimension is minimized and denoted as $T_{min}$.

Figure 4:
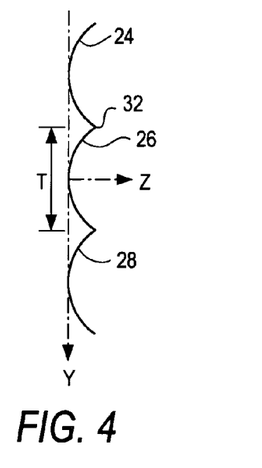
FIG. 4 is an enlarged side view of the surface profile of the component of FIG. 2.
Figure 5:
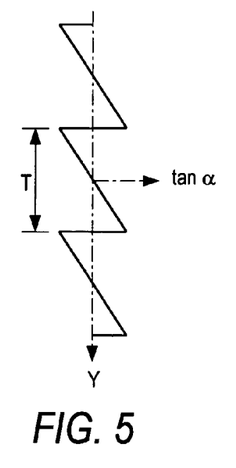
FIG. 5 is a graph to explain ray directions exiting the component having the surface profile of FIG. 4.

As shown in FIG. 4, each structure has a curved surface profile, preferably a parabola, so that each such profile can be expressed by the parabolic equation $Z=Y^2/2R$, where R is the local radius of curvature. FIG. 5 is a corresponding graph depicting the local tilt or directions in which the rays are refracted. Specifically, the tangent of $\alpha$ is plotted against the direction Y along which the structures are arranged.

Figure 7:
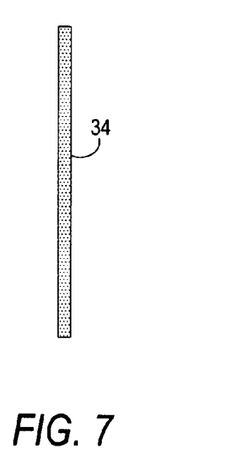
FIG. 7 is a representation of a single line aiming pattern generated by the embodiment of FIG. 4 or FIG. 6.

In accordance with Snell's law of refraction, tan $\alpha$ approximately equals $$(dZ/dY)(n-1)=Y(n-1)/R,$$

where n equals the index of refraction. The maximum ray direction $\alpha_{max}$ is approximately equal to atan $[T_{min}(n-1)/2R]$. It will be observed that the tan $\alpha$ varies linearly with the ray direction, and therefore, the light projected from the component forms a single visible aiming line 34 with a generally uniform light intensity distribution over its length, as depicted in FIG. 7, for the aiming light pattern on the target.

By way of example, it is assumed that the front portion of the optical component has a focal length of 3.5 mm and collimates the laser beam from the diode which diverges at an angle of about 25°–40°, to form at the rear portion of the component a beam spot having a beam dimension D of about 1.5–2.4 mm at a 50% level of light intensity. If the structural dimension T is chosen to be about 0.5 mm, and if the index of refraction is about 1.5, then an aiming pattern having an angular spread $2\alpha$ equal to about 30° is achieved. The local radius of curvature R is approximately equal to $T(n-1)/2\tan\alpha_{max}=0.47$ mm. Each surface profile will have a depth $\Delta Z = T^2/8R=0.067$ mm. These millimeter dimensions for each refractive structure are easily fabricated by machining or molding, and the optical component is advantageously formed from glass or plastic.

Figure 6:
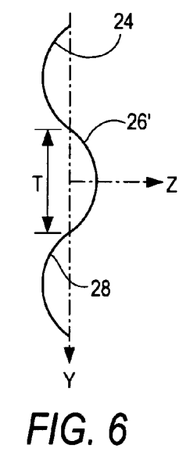
FIG. 6 is a view analogous to FIG. 4, but of another embodiment of this invention.

In those cases where sharp cusps, such as cusp 32 in FIG. 4, are difficult to fabricate cleanly, these sharp corners can be eliminated by reversing the curvature of central groove 26 to obtain a concave profile as depicted in FIG. 6 for structure 26'. The structural component having the sinusoidal profile of FIG. 6 will also produce the single line pattern of uniform intensity shown in FIG. 7.

Figure 8:
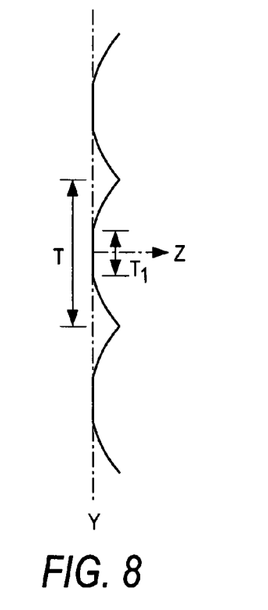
FIG. 8 is a view analogous to FIG. 4, but of another embodiment of this invention.
Figure 9:
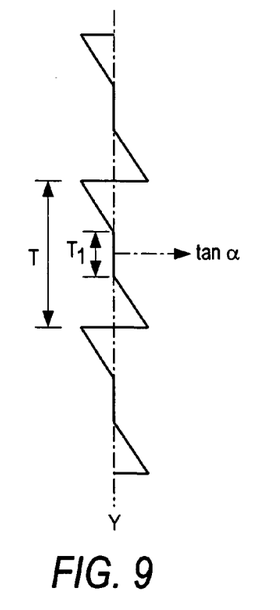
FIG. 9 is a graph to explain ray directions exiting the component having the surface profile of FIG. 8.
Figure 10:
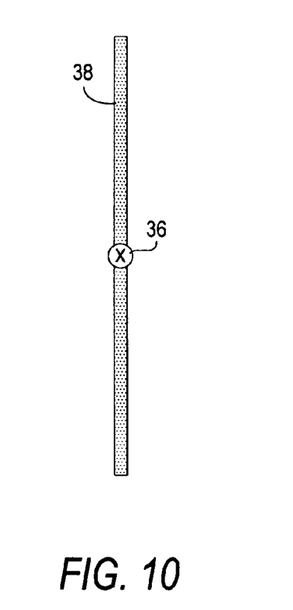
FIG. 10 is a representation of an aiming pattern comprising a single line and a single spot generated by the embodiment of FIG. 8.

FIG. 8 is analogous to FIG. 4, except that each refractive structure is configured to have a central planar surface $T_1$ and is flanked on opposite sides by curved parabolic surfaces. The curved surfaces can be expressed as $Z=(Y+0.5T_1)^2/2R$. The tan α is plotted in FIG. 9, and approximately equals $(dZ/dY)(n-1)$. Light passing through the central planar surface (where α=0) is not tilted, but travels straight through to generate a central aiming spot 36 having a spot intensity. The amount of energy that goes into the central spot is controlled by the relative length $T_1$ of the planar surface. The curved surfaces produce the single aiming line 38 of uniform light intensity on which the spot is superimposed. The spot has a higher intensity than that of the line 38 and is used to mark the center of the imaging field of view.

Figure 11:
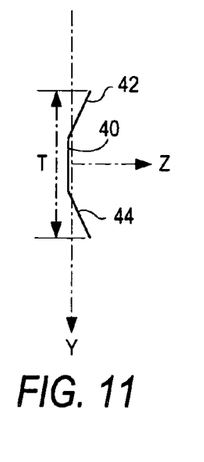
FIG. 11 is a representative enlarged side view of another surface profile of the optical component in accordance with another embodiment of the invention.
Figure 12:
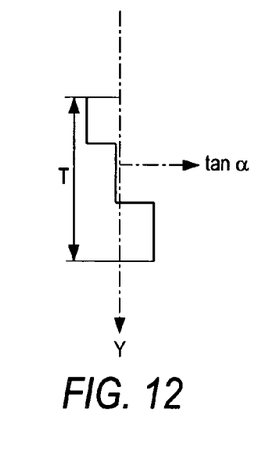
FIG. 12 is a graph to explain ray directions exiting the component having the surface profile of FIG. 11.
Figure 13:
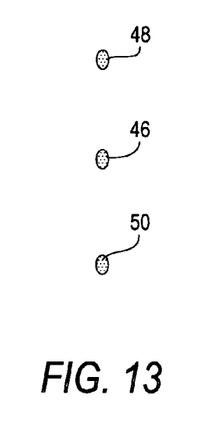
FIG. 13 is a representation of an aiming pattern comprising three aiming spots generated by the embodiment of FIG. 11.

FIG. 11 is analogous to FIG. 8, except the profile of only one refractive structure is shown, and it has three planar surfaces 40, 42, 44, the outer planar surfaces 42, 44 being inclined relative to the center planar surface 40. FIG. 12 is a plot of tan α, and it will be observed that light passing through each of the planar surfaces (where α=0) passes through undeflected, thereby resulting in the three aiming spots 46, 48, 50 of the aiming pattern of FIG. 13. Central spot 46 marks the center of the field of view, and end spots 48, 50 mark the edges of the field of view. The amount of energy in each spot depends on the relative lengths of the planar surfaces 40, 42, 44.

Figure 14:
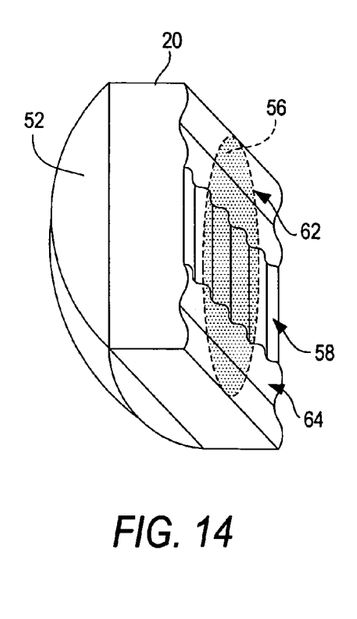
FIG. 14 is a rear perspective view of an optical component in accordance with another embodiment of this invention.
Figure 15:
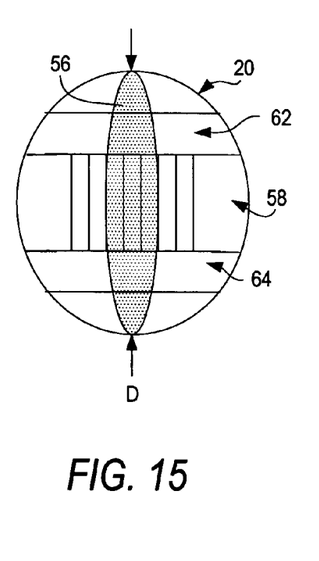
FIG. 15 is an end view of the component of FIG. 14 with a laser beam superimposed thereon.
Figure 16:
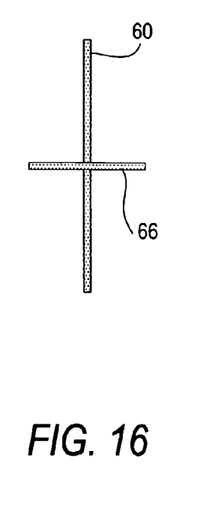
FIG. 16 is a representation of an aiming pattern comprising two intersecting lines generated by the embodiment of FIG. 14.

FIG. 14 depicts another embodiment of the optical component as seen from a rear perspective. The front portion is configured as a convex lens 52, and a plurality of groups of the refractive structures is shown at the rear portion 54. The elliptical beam cross-section 56 having beam dimension D is superimposed on the structures. One of the groups is arranged along a central row 58, and the structures of the central row 58 are configured with the sinusoidal profile of FIG. 6 to project an aiming line 60 depicted in FIG. 16. Two more of the groups are arranged along top 62 and bottom 64 rows, each perpendicular to the central row 58. The structures of the top and bottom rows are each configured with the sinusoidal profile of FIG. 6 to project an aiming line 66 which crosses the line 60 to form the cross-hairs pattern of FIG. 16.

By way of example, if the optical component has an outer diameter of 2.5 mm, then the central row can occupy a zone of about 0.7 mm, and the top and bottom zones can occupy a zone of about 0.9 mm each. To determine the structural dimension T of each structure in the central row, the divergence angle of the laser beam spot 56 parallel to the diode junction is taken into account, and corresponds to a beam dimension D of about 0.4 to 0.7 mm at a 50% intensity level. The structural dimension T amounts to about 0.4 mm. The structural dimension of each of the top and bottom rows typically amounts to about 0.5 mm.

Figure 17:
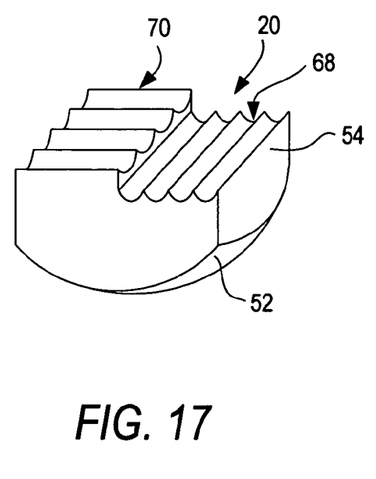
FIG. 17 is a front perspective view of an optical component in accordance with another embodiment of this invention.

FIG. 17 depicts another embodiment of the optical component 20 similar to that of FIG. 14, but only having two groups, and with each group having refractive structures configured as shown in FIG. 4. One of the groups extends along a row 68 and occupies about half of the rear portion 54 of the component, while another of the groups extends along a row 70 perpendicular to row 68 and occupies the other half of the rear portion 54.

Figure 18:
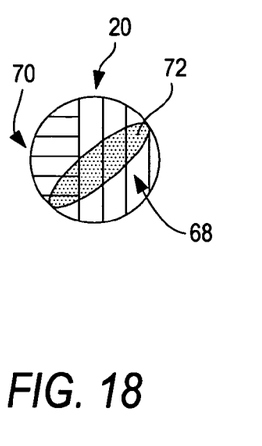
FIG. 18 is an end view of the component of FIG. 17 with a laser beam superimposed thereon.
Figure 19:
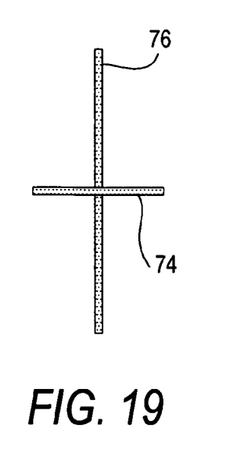
FIG. 19 is a representation of an aiming pattern comprising two intersecting lines generated by the embodiment of FIG. 17.

It is especially desirable if the elliptical beam cross-section 72 is arranged so that its major axis extends diagonally across both rows 68, 70, as shown in FIG. 18. This can be accomplished by turning the laser diode or the optical component 20. The row 68 of refractive structures generates an aiming line 74, and the row 70 of refractive structures generates another aiming line 76 which crosses the line 74 at a right angle and produces the cross-hairs pattern of FIG. 19.

Figure 20:
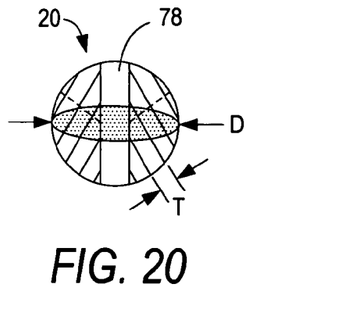
FIG. 20 is a view analogous to FIG. 18, but of still another embodiment of this invention.
Figure 21:
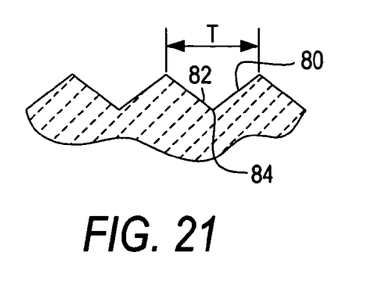
FIG. 21 is an enlarged, broken-away view of the surface profile of the component of FIG. 20.

Still another embodiment of the optical component is depicted in the end view of FIG. 20, in which the rear portion is subdivided into three zones, namely a central zone having a central planar surface 78, and a pair of end zones having a plurality of refractive structures each having a pair of planar surfaces 80, 82 meeting each other, as shown in FIG. 21, along linear edges 84 that are inclined at opposite angles of inclination relative to the elongation of the central surface 78.

Figure 22:
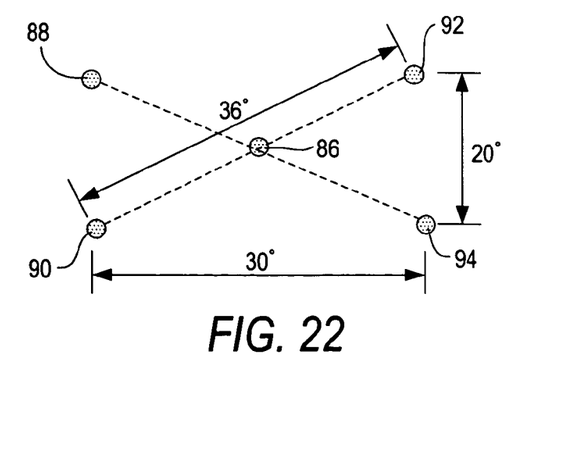
FIG. 22 is a representation of an aiming pattern comprising five spaced-apart aiming spots generated by the embodiment of FIG. 20.

Light passing through the central planar surface 78 is projected onto the indicia as a central aiming spot 86. If a periodic structure were configured at the central zone, then the central spot would be elongated. Light passing through one of the end zones is projected by the planar surfaces 80, 82 onto the indicia as a pair of end aiming spots 88, 90, while light passing through the other of the end zones is projected by the planar surfaces 80, 82 onto the indicia as another pair of end aiming spots 92, 94, thereby forming the aiming pattern of FIG. 22 as five aiming spots which mark the center and the four corners of the field of view. If a 20° by 30° field of view is desired, then each end zone is given an 18° surface tilt, so that 18° times (n−1), where n=1.5, equals 36°.

Figure 23:
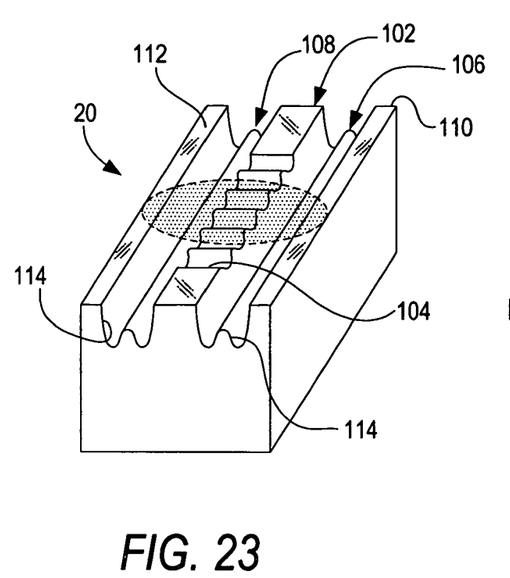
FIG. 23 is a perspective view of an additional embodiment of this invention.
Figure 24:
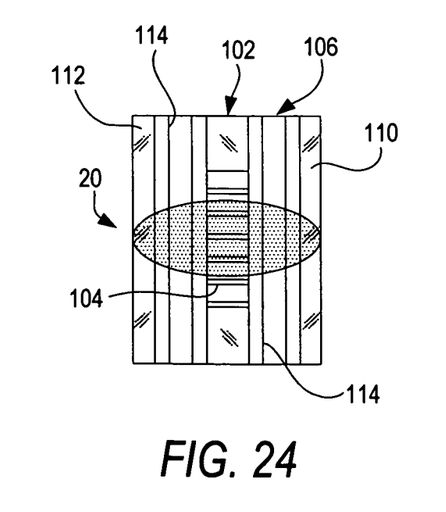
FIG. 24 is a top plan view of FIG. 23.
Figure 25:
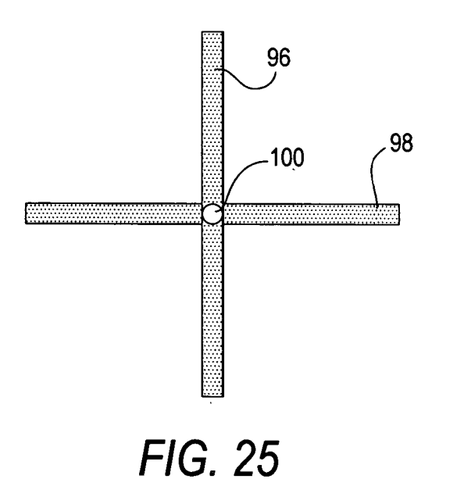
FIG. 25 is a representation of an aiming pattern comprising two intersecting lines and a central aiming spot generated by the embodiment of FIGS. 23–24.

Yet another embodiment of the optical component is depicted in FIGS. 23–24 operative for producing a pair of intersecting lines 96, 98 in an aiming pattern of FIG. 25 which is further characterized by a bright central spot 100 and currently deemed to be the preferred embodiment of this invention. The embodiment of FIGS. 23–24 has a central zone 102 having a plurality of refractive structures 104 operative for producing the vertical line 96 in the aiming pattern, a pair of side zones 106, 108 having a plurality of refractive structures 114 operative for producing the left half and the right half of the horizontal line 98 in the aiming pattern, and a pair of flat end zones 110, 112 operative for producing the central spot 100, preferably with an intensity greater than the intensity of the lines 96, 98.

Other configurations are, of course, possible. The structures are preferably periodic and, as previously mentioned, the structural dimension T of each structure need not be identical for all the structures on one optical component.

Although the optical component has been described as having an integral front portion or collimating lens, collimation can be performed by a discrete optical element remote from the reflective structures. The optical element preferably has built-in correction for spherical aberrations, and its surface profile can be expressed by the function $Z=aR^4$ where Z is the surface sag, a is a spherical aberration coefficient, and R is the radial lateral coordinate perpendicular to the optical axis.

For each embodiment, lateral translation of the beam spot does not change the intensity distribution in the aiming pattern. Thus, position error from the input beam is made tolerable due to the repetitive nature of the refractive structures.

As described so far, the intensity distribution over a line in the above-described aiming patterns is preferably uniform, but this is not necessarily the case. It is sometimes desirable that the intensity distribution be non-uniform. For example, if more intensity toward the ends of the line, as compared to the center of the line, is desired, then a sinusoidal curvature for each structure, rather than a parabolic curvature, would be beneficial. The intensity distribution varies inversely as the second derivative of the surface profile of the refractive structure.

It will be understood that each of the elements described above, or two or more together, also may find a useful application in other types of constructions differing from the types described above.

While the invention has been illustrated and described as embodied in an image capture system and method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An aiming pattern generator in an imaging reader for electro-optically reading indicia having parts of different light reflectivity, comprising:
   a) an optical component having a plurality of refractive structures spaced apart along a direction, each structure having a structural dimension T as measured along the direction; and
   b) means for generating a visible, collimated, light beam having a wavelength $\lambda$ and a beam cross-section that has a beam dimension D as measured along the direction, and for directing the beam along an optical axis through the refractive structures for refraction to project an aiming light pattern on the indicia to be read at a maximum angle $\alpha_{max}$ as measured relative to the optical axis, the beam dimension D being greater than the structural dimension T, and the structural dimension T being greater than the wavelength $\lambda$ divided by the sine of the maximum angle $\alpha_{max}$.

2. The aiming pattern generator of claim 1, wherein the generating means includes a laser diode for generating a diverging laser beam, an aperture stop in the path of the diverging beam for forming a predetermined cross-section for the laser beam, and a portion of the optical component being operative for optically modifying the beam of predetermined cross-section into the collimated beam.

3. The aiming pattern generator of claim 1, wherein the refractive structures have curved surfaces for generating the aiming light pattern as a single aiming line with a substantially uniform light intensity lengthwise along the line.

4. The aiming pattern generator of claim 3, wherein each curved surface is one of a convex and a concave curvature.

5. The aiming pattern generator of claim 1, wherein the refractive structures have planar surfaces and curved surfaces for generating the aiming light pattern as a single aiming line having a line intensity, and a single aiming spot on the aiming line and having a spot intensity greater than the line intensity.

6. The aiming pattern generator of claim 5, wherein at least one of the refractive structures has one of the planar surfaces flanked by two of the curved surfaces.

7. The aiming pattern generator of claim 1, wherein the refractive structures have a plurality of planar surfaces for generating a plurality of aiming spots.

8. The aiming pattern generator of claim 7, wherein at least one of the refractive structures has one of the planar surfaces flanked by two more of the planar surfaces inclined relative to the one planar surface.

9. The aiming pattern generator of claim 1, wherein the refractive structures are arranged in groups, one of the groups being arranged in a central row along the direction, and two more of the groups being arranged along respective side rows along a transverse direction perpendicular to the direction and being located at opposite sides of the central row, the central row of refractive structure having curved surfaces for generating an aiming line, and the side rows of refractive structures having curved surfaces for together generating another aiming line, the aiming pattern comprising both lines appearing on the indicia as crossing at a right angle.

10. The aiming pattern generator of claim 9, wherein the optical component has a pair of elongated planar faces through which the beam projects as a central aiming spot on the indicia at a junction where both lines cross.

11. The aiming pattern generator of claim 1, wherein the refractive structures are arranged in groups, one of the groups being arranged along one row along the direction, and another group being arranged along another row along a transverse direction perpendicular to the direction; and wherein the beam cross-section is an ellipse having a major axis extending diagonally across both rows; and wherein both rows of refractive structures have curved surfaces for together generating two aiming lines appearing on the indicia as crossing at a right angle.

12. The aiming pattern generator of claim 1, wherein the optical component has a central elongated planar face through which the beam projects as a central aiming spot on the indicia, and wherein the refractive structures are arranged in two side rows at opposite sides of the central face and inclined at opposite angles of inclination relative to the elongation of the central face, and wherein each refractive structure of one of the side rows has a pair of planar surfaces for generating a pair of end aiming spots spaced in one direction away from the central spot, and wherein each refractive structure of the other of the side rows has a pair of planar surfaces for generating another pair of end aiming spots spaced in an opposite direction away from the central spot, the aiming pattern comprising five aiming spots.

13. The aiming pattern generator of claim 1, wherein the refractive structures are periodically spaced along the direction, each refractive structure having a parabolic curvature.

14. The aiming pattern generator of claim 1, wherein the optical component is constituted of a molded material having an index of refraction on the order of 1.5.

15. The aiming pattern generator of claim 1, wherein at least one of the refractive structures is a channel extending along a transverse direction perpendicular to the direction.

16. The aiming pattern generator of claim 1, wherein at least one of the refractive structures is a hump extending along a transverse direction perpendicular to the direction.

17. A method of generating an aiming pattern in an imaging reader for electro-optically reading indicia having parts of different light reflectivity, comprising the steps of:
   a) spacing a plurality of refractive structures of an optical component apart along a direction, each structure having a structural dimension T as measured along the direction; and
   b) generating a visible, collimated, light beam having a wavelength $\lambda$ and a beam cross-section that has a beam dimension D as measured along the direction, and directing the beam along an optical axis through the refractive structures for refraction to project an aiming light pattern on the indicia to be read at a maximum angle $\alpha_{max}$ as measured relative to the optical axis, the beam dimension D being greater than the structural dimension T, and the structural dimension T being greater than the wavelength λ divided by the sine of the maximum angle $\alpha_{max}$.

18. The method of claim 17, and configuring the refractive structures to have curved surfaces for generating the aiming light pattern as a single aiming line with a substantially uniform light intensity lengthwise along the line.

19. The method of claim 17, and configuring the refractive structures to have planar surfaces and curved surfaces for generating the aiming light pattern as a single aiming line having a line intensity, and a single aiming spot on the aiming line and having a spot intensity greater than the line intensity.

20. The method of claim 17, and configuring the refractive structures to have a plurality of planar surfaces for generating a plurality of aiming spots.

21. The method of claim 17, and configuring the refractive structures to be arranged in groups, one of the groups being arranged in a central row along the direction, and two more of the groups being arranged along respective side rows along a transverse direction perpendicular to the direction and being located at opposite sides of the central row, the central row of refractive structure having curved surfaces for generating an aiming line, and the side rows of refractive structures having curved surfaces for together generating another aiming line, the aiming pattern comprising both lines appearing on the indicia as crossing at a right angle.

22. The method of claim 17, and configuring the refractive structures to be arranged in groups, one of the groups being arranged along one row along the direction, and another group being arranged along another row along a transverse direction perpendicular to the direction;

and positioning the beam cross-section which is an ellipse to have a major axis extending diagonally across both rows; and configuring both rows of refractive structures to have curved surfaces for together generating two aiming lines appearing on the indicia as crossing at a right angle.

23. The method of claim 17, and configuring the optical component to have a pair of elongated planar faces through which the beam projects as a central aiming spot on the indicia at a junction where both lines cross.

24. The method of claim 17, and configuring the optical component to have a central elongated planar face through which the beam projects as a central aiming spot on the indicia, and configuring the refractive structures to be arranged in two side rows at opposite sides of the central face and inclined at opposite angles of inclination relative to the elongation of the central face, and configuring each refractive structure of one of the side rows to have a pair of planar surfaces for generating a pair of end aiming spots spaced in one direction away from the central spot, and configuring each refractive structure of the other of the side rows to have a pair of planar surfaces for generating another pair of end aiming spots spaced in an opposite direction away from the central spot, the aiming pattern comprising five aiming spots.

* * * * *